Patented June 3, 1941

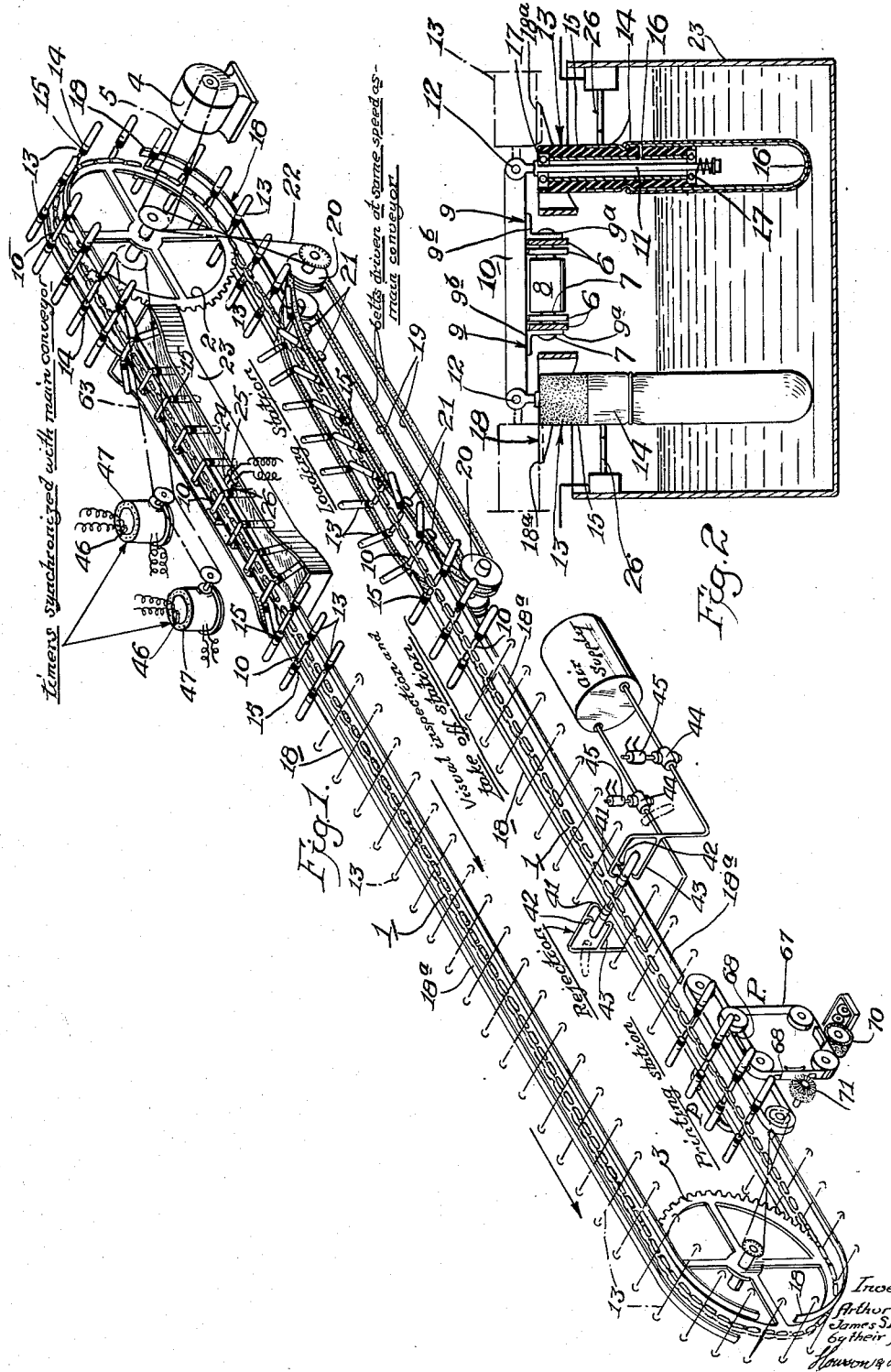

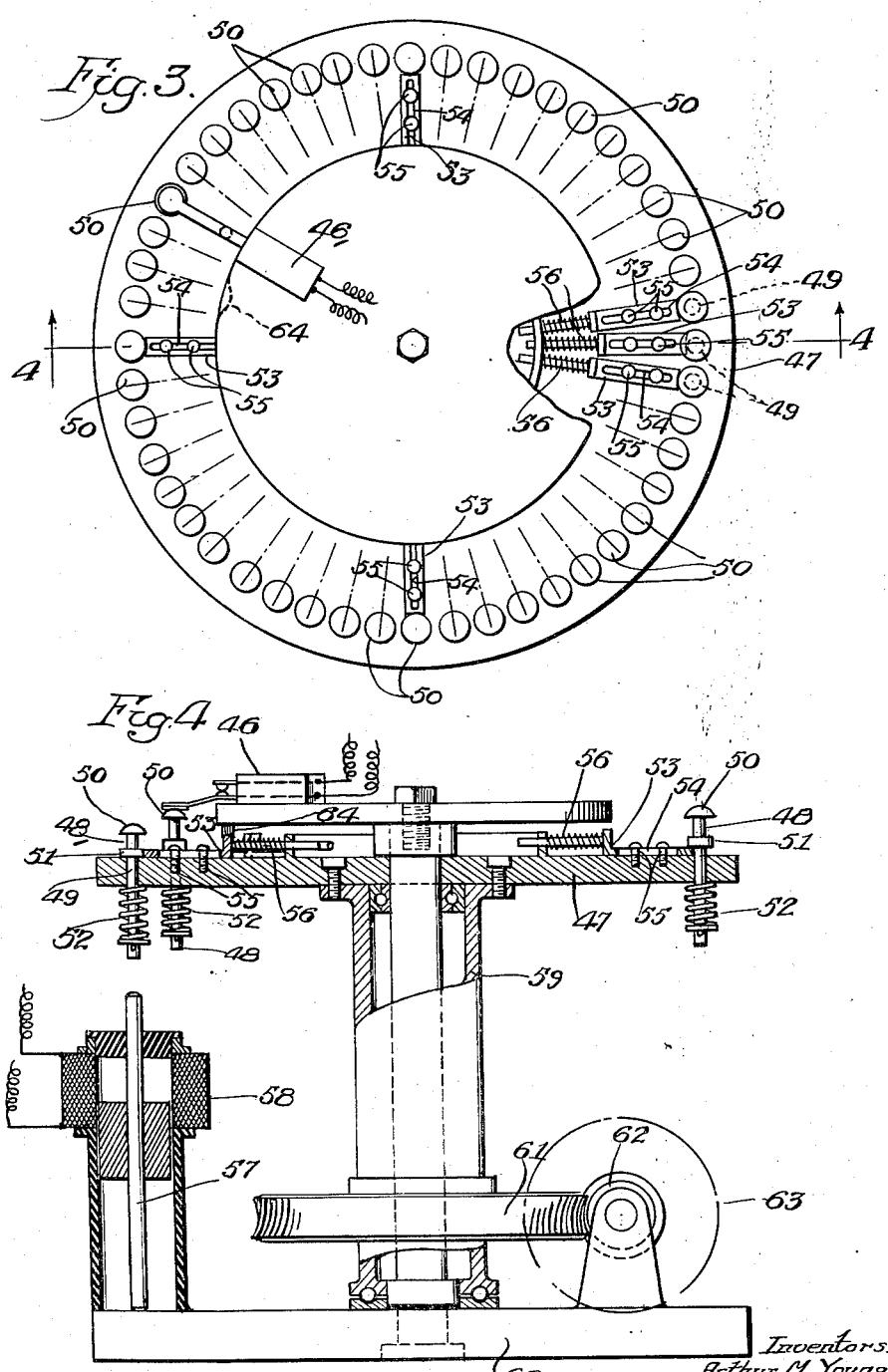

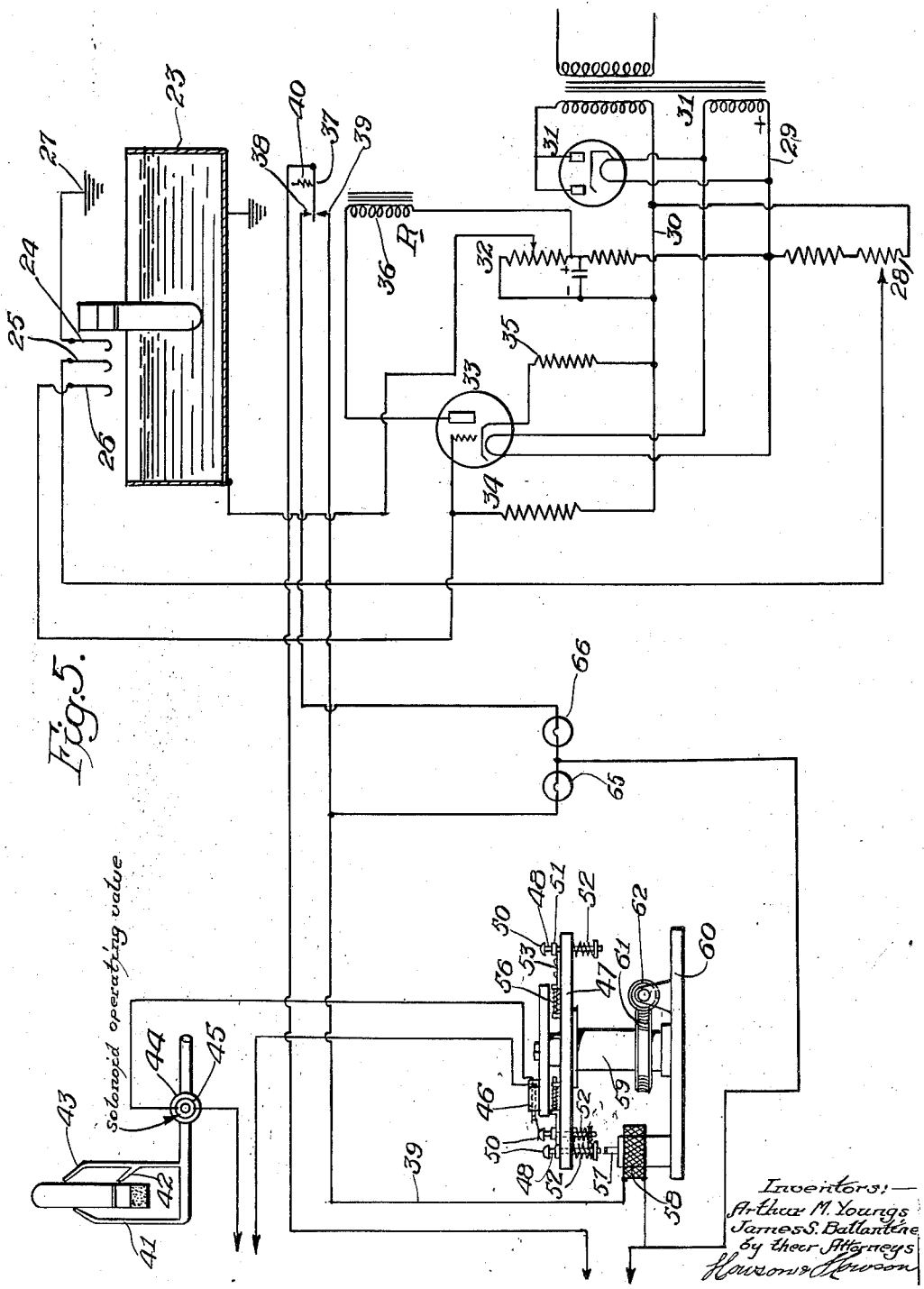

2,244,591

UNITED STATES PATENT OFFICE 2,244,591

APPARATUS FOR TESTING PROPHYLACTIC ARTICLES OF THIN RUBBER

Arthur M. Youngs, Trenton, and James S. Ballantine, Absecon, N. J., assignors to Youngs Rubber Corp. of N. J., Trenton, N. J., a corporation of New Jersey Application March 30, 1939, Serial No. 265,018

28 Claims. (Cl. 209—81)

This invention relates to new and useful improvements in apparatus for testing thin rubber articles and more particularly for testing such articles for imperfections, such as holes and perforations therein.

Concurrently with the drive on the part of government and various sociologic associations against venereal diseases, attempts are being made on the part of manufacturers to control the manufacture of rubber prophylactic articles and prevent the sale of such articles as may be defective or imperfect due to the presence of holes or perforations therein.

With the foregoing in mind, the principal object of the present invention is to provide a novel apparatus for testing rubber prophylactic articles whereby any hole or perforation therein, however small, may be readily observed or detected, thus permitting imperfect articles to be rejected.

Another object of the invention is to provide a novel apparatus for detecting holes and perforations in thin rubber prophylactic articles which involves also the automatic rejection of those articles found to be imperfect.

A still further object of the invention is to provide apparatus for testing articles of the type described which is accurate, foolproof and entirely automatic and continuous in operation.

These and other objects and features of the invention and the various details of its construction and operation are hereinafter fully set forth and shown in the accompanying drawings, in which:

Figure 1 is a semi-diagrammatic view in perspective of one apparatus contemplated by the present invention for testing thin rubber articles.

Figure 2 is an enlarged transverse view in section through the upper run of the apparatus at the point of test.

Figure 3 is a plan view of a timing device partially broken away to illustrate certain details of its construction and operation.

Figure 4 is a view in section taken on line 4—4, Figure 3; and

Figure 5 is a diagrammatic view of the electrical equipment, circuits and connections thereof to the several mechanisms of the apparatus.

The invention is based essentially upon the discovery that by stretching prophylactic articles of thin rubber over a mandrel or other supporting form and then immersing the same in a bath of liquid, the said liquid will pass through even the most minute hole or perforation in the article and spread over the interior surface thereof between said article and mandrel producing a comparatively dark spot or area which is readily perceptible to the human eye. In addition to the positive visible detection of holes and perforations thus afforded, this use of a liquid bath may be employed in conjunction with certain electrical equipment, hereinafter described, to detect holes or perforations in an article, and in such event use may also be made of said electrical equipment to effect the removal of any article determined thereby to be defective or imperfect.

The bath employed may be water or any other suitable liquid and the surface tension thereof may be reduced to the desired extent by heating the liquid or adding to it a suitable wetting agent such as, for example "Aerosol." It is not essential, however, in detecting holes and perforations by electrical means that the surface tension of the water or other liquid be reduced, but in practical application of the invention, a bath of liquid having a low surface tension has been used in order to enable the visible detection of any holes or perforations in addition to detection thereof by electrical means.

Referring now to the drawings, there is there illustrated one form of apparatus capable of carrying out the present invention and, referring particularly to Figure 1 thereof, reference numeral 1 designates generally an endless conveyor of the chain type carried upon sprocket wheels 2 and 3, movement of the chain conveyor being continuous and in the direction of the arrows. The sprocket wheel 3 is merely an idler and the chain 1 is driven by the sprocket 2 which is in turn driven from a motor 4 through a suitable belt, chain or the like 5.

The chain conveyor 1 is of the conventional articulated link type comprising pairs of side bars or links 6 pivotally connected to the adjacent or next pair of bars or links 6 by means of a pin 7 which also carries a roller 8, interposed between said side bars or links 6, for engagement with the teeth of the sprocket wheels 2 and 3 in the usual manner. Rigidly secured to the pivot pins 7 at opposite ends thereof are brackets 9 having a vertical leg 9a and an upper outwardly projecting horizontal leg 9b. A bar or rod 10 is secured to the horizontal legs 9b of each pair of brackets 9 so as to extend transversely of the chain conveyor 1 and beyond each side thereof.

Pivotally connected to opposite ends of each cross bar 10 by means of a spindle 11 as at 12 for swinging movement in a plane perpendicular to the plane of travel of the chain 1 is a mandrel or like support, designated generally as 13, for the thin rubber articles. The mandrels 13 comprises a hollow main body portion 14 of suitable metal and a base or hub portion 15 of suitable dielectric material such as hard rubber, micarta, Bakelite, or the like. As shown, the main metal body portion 14 of the mandrel or support 13 is pressed upon the adjacent end portion of the base or hub 15 and is also provided with one or more apertures or vents 16 therein through which air may pass from the interior of the rubber articles when mounting the same on said body portions of the mandrels.

These body portions 14 of the mandrels 13 are of greater length and diameter than the normal length and diameter of the articles so that the latter are supported thereon in a relatively stretched condition, and in order properly to retain said articles in that condition on the bodies 14 the said bodies are each provided with a circumferential groove toward or adjacent the base end of the mandrels which groove is intended to receive the usual bead provided at the open end of the articles.

The dielectric base or hub portion 15 of the mandrel or support 13 is in the form of a relatively thick sleeve or tube and is journalled upon the pivotally mounted spindle 11 by means of suitable ball bearing structures 17 so as to permit rotation of the mandrels freely about said spindles. Thus the mandrel 13, including its main body and base portions 14 and 15, is free to rotate about the spindle 11, and at the same time, by virtue of the pivotal connection 12 of the spindle 11 with the bar 10, is movable in a plane perpendicular to the plane of travel of the chain 1.

The several mandrels 13 are supported in the desired angular position laterally of the chain 1 by means of tracks or guides 18 disposed at either side thereof and in subjacent contact with the hub or base portion 15 of said mandrels, the tracks or guides 18 being stationary and having a friction surface 18a so that the mandrels 13 are caused to roll therealong and rotate about their supporting spindles 11 as they are advanced by the chain 1.

The tracks or guides 18 extend throughout the cycle or course of the chain 1 except for two relatively short lengths thereof in which the thin rubber articles are respectively mounted upon the mandrels 13 and stamped with printed matter, these stations being located adjacent the beginning and end respectively of the lower run of the course of the said chain 1. The tracks or guides 18 are so positioned with respect to the chain 1 that their upper surfaces 18a support the mandrels 13 in a substantially horizontal position throughout the greater part of the chain course.

The thin rubber articles are manually mounted upon the mandrels during the course of travel of the chain 1 near the end of its lower run and at this loading station the hubs or bases 15 of the mandrels 13 leave the stationary tracks or guides 18 and are engaged by an endless belt 19. This belt 19 is carried upon main and auxiliary rolls 20 and 21 respectively so as to elevate the upper course of said belt 19 above the level of the track or guides 18 and thereby elevate or incline the mandrels 13 upwardly at an angle of approximately 45° to facilitate mounting of the thin rubber articles thereon. Mounting of the articles upon the mandrels 13 which rotating about their supporting spindles 11 is extremely difficult and in order to prevent such rotation of said mandrels 13 during this loading stage, the belt 19 is driven in the direction of travel of the chain 1 and at exactly the same speed as said chain so that no rotation of the mandrels takes place while in contact with said belt 19, and to insure exact coordination and duplication of the speed of the chain 1 and belt 19, the latter is driven from the driving means of the former through a chain, belt or the like 22.

Upon leaving the belt 19, the mandrels 13, each with an article mounted thereon, engage the tracks or guides 18 and are supported thereby in a laterally projecting horizontal position in which position they are carried by the chain 1 about the sprocket wheels 2 into the upper run of the course where they traverse an open trough or tank 23 of suitable length and width. In this portion of the upper run over the tank 23 the tracks or guides 18 converge gradually into closer spaced relation with respect to the chain 1 and their upper mandrel contacting surfaces 18a gradually decline outwardly and downwardly until they are disposed in a substantially vertical plane, thus permitting the said mandrels 13 to swing downwardly into the trough or tank 23 as shown in Figure 2 of the drawings. After the mandrels 13 have moved through the trough or tank a relatively short distance in the substantially vertical position shown in said Figure 2, the tracks or guides 18 and their upper surfaces gradually return to their previous relative positions thus causing the mandrels 13 to be gradually raised or swung upwardly out of said trough or tank 23 into horizontal position again for continued movement through the course.

The trough or tank 23 is filled with a suitable liquid such as, for example, water and the surface tension thereof is preferably reduced or decreased by heating the same, or by adding thereto a suitable wetting agent such as, for example, "Aerosol." The liquid or bath is of such depth and so spaced below the chain 1 that as the mandrels 13 swing downwardly into the same, in the manner previously described, the articles mounted thereon are substantially entirely immersed in said liquid for a predetermined though comparatively short period of time and travel. During immersion of the articles the liquid will, by reason of its low or reduced surface tension, pass or seep through the most minute hole or aperture in the article, spreading out over the inner surface thereof between said article and its supporting mandrel and around such hole or perforation producing a comparatively darker spot or area which is readily perceptible to the eye, thus indicating to an observer or inspector that the particular article is imperfect and defective.

While a visible detection or test in this manner is positive and accurate in its results there is no way or manner of removing or segregating a defective article which does not present, either directly or indirectly, the element of human error. To eliminate entirely the human element, therefore, there is provided a novel means and method for detecting the presence of holes or apertures in the articles by electrical means, and then removing from its mandrel 13 by mechanism controlled by said electrical means, each article thus detected to be imperfect.

This detection of imperfections in the articles through the medium of an electric current involves the principle of current leakage through the rubber article which, being a dielectric and disposed between the metal mandrel body 14 and the liquid bath, functions therewith as a condenser. As shown in the drawings, three relatively resilient or flexible electrodes 24, 25 and 26, respectively, are suitably mounted adjacent each side of the trough 23 for successive momentary engagement by each mandrel on the corresponding side of the chain 1 with its rubber article through the liquid bath. These electrodes are insulated from the trough or tank 23 and are arranged so as to be engaged by the inner or upper end portion of the metal mandrel body portion 14 which is exposed and not covered or insulated by the rubber article.

As just stated, there is provided a group of three such electrodes for cooperation with the mandrels 13 carried at respectively opposite sides of the chain 1 and each of these groups of electrodes with an electrical circuit and equipment of its own are entirely independent from that of the other group of electrodes. However, since these electrical systems and their associated controlled mechanisms are the same in construction, arrangement and operation for testing and rejecting the rubber articles at both sides of the apparatus, a description of one such system is all that is necessary and from this point on our description of the invention, its construction and operation will deal, for the most part, with but one side only of the said apparatus except where necessity requires otherwise.

Bearing this in mind, the electrode 24 is first engaged by the mandrels 13 and this electrode is grounded as indicated at 27 to function as a static discharge means to remove from the metal body 14 of said mandrels any static or other electrical charge that may be retained thereon. The second electrode 25 in the series is connected to a point on a potentiometer 28 which is connected across the positive and negative supply conductors 29 and 30, the latter being the output leads from a conventional transformer and rectifier assembly designated generally as 31. The trough 23 is connected to a point on a potentiometer 32 which is also connected across the aforementioned supply leads 29 and 30. The tank 23 is maintained at ground potential as shown and the final electrode 26 is connected to the control grid of a simple triode vacuum tube 33. This grid is connected also to the power supply 30 and to the cathode of the tube 33 through a resistor 34 and the tube is self-biased by means of a conventional cathode resistor 35 which functions to normally maintain a desired biasing potential between the cathode and grid. The plate circuit of the tube 33 includes the winding 36 of a relay R whose armature 37 is movable between contacts 38 and 39, and normally maintained in its upper position in closed relation with said contact 38 by means of a spring 40. If desired, one or more conventional vacuum tube amplifier stages may be interposed between tube 33 and relay R.

As previously stated, the invention contemplates a novel method and mechanism for removing from its mandrel each article that is found to be imperfect and as shown in Figure 1 of the drawings this consists of three jets or nozzles 41, 42 and 43, respectively, located along the lower run of the course of the chain 1. These jets or nozzles 41, 42 and 43 are connected through a valve 44 to a source of compressed air and are so positioned with respect to the mandrels 13 passing adjacent thereto that upon opening of said valve 44 the air discharged from said jets engages the said rubber article and expels or blows the same from its mandrel 13. The air valve 44 is normally closed and opening thereof is effected by means of a solenoid 45 which is connected to a suitable source of electricity and energized by the closing of a normally open spring contact switch 46 which is secured in a predetermined fixed relation with respect to a control mechanism hereinafter described.

It will be obvious, of course, that a large number of mandrels 13 are carried by the chain 1 at one side thereof and that at any one instant the number of mandrels on that side intermediate or between the electrode 26 and the blow-off position at the air jets will be proportionately large but constant. Accordingly, in order that a particular article found defective at the time of contact with the electrode 26 will be blown off at the instant that same article passes the jets or nozzles 41, 42 and 43, a timing disk or plate 47 provided with a plurality of pin elements 48 is employed. The disk 47 is disposed in a horizontal relation and the several pins 48 are mounted for vertically sliding movement adjacent the periphery thereof. As more particularly shown in Figure 4 of the drawings, the pins 48 comprise a relatively slender spindle portion 49 having a head 50 at their upper ends and an annular shoulder 51 spaced a relatively short distance below the head 50 but above the plate or disk 47. The shoulders 51 function in one instance as stops to limit downward movement of the pins 48 which are normally retained at this lower limit, with their shoulders 51 resting upon the upper surface of the disk 47, by means of coil springs 52.

Associated with each pin 48 is a latch element 53 having a slot 54 longitudinally therein and mounted for sliding movement with respect to guide pins 55 radially of the disk 47 in alignment with such pin. These latch elements 53 are each constantly urged toward the pins 48 by means of a spring 56 with the result that as each pin 48 is actuated upwardly through the disk 47, the latch 53 associated with said pin immediately moves radially outward under the influence of its spring 56 beneath the now elevated shoulder stop 51 of the pin with the result that the latter is thereby retained in the position to which upwardly actuated. Thus elevated, the heads 50 of the pins 48 are in a position to engage the switch 46 and close the same causing energization of the solenoid 45 to open the air valve 44.

Upward actuation of the pins 48 as above described is effected by means of a solenoid actuated plunger 57 which, upon energization of the solenoid 58, is actuated upwardly into engagement with the lower end of the overlying pin 48. The solenoid 58 is connected to a suitable source of electricity through the contact 39 and armature 37 of the relay whose winding 36 is connected in the plate circuit of the previously described triode tube 33, and since the spring 40 normally maintains the armature 37 in closed relation with the other contact 38 and not contact 39, the said solenoid 58 will normally remain deenergized.

Returning again to the disk 47, pins 48 and the relative positions of the switch 46 and solenoid 58 with respect to the circumference of said disk, it is pointed out that in the arc of rotation of the disk 47 from the solenoid 56 to the switch 46 which controls the air valve solenoid 45, there must be exactly the same number of the pins 48 as there are mandrels 13 between the electrode 26 and the blow-off position adjacent the jets 41, 42 and 43 and since said mandrels 13 are equally spaced along the chain 1, the said pins 48 must be equally spaced with respect to each other on the disk 47.

The disk 47 is fixed upon a vertical sleeve 59 which is journalled in a base or support 60 and said sleeve 59 and disk 47 are driven, through a gear 61, worm 62 and chain, belt or the like 63 from the motor 4, in timed relation with the travel of the mandrel chain 1 and at such speed of rotation that any given pin 48 on said disk 47 travels from a position in alignment with the plunger 57 of the solenoid 58 to a position immediately below the switch 46 for the solenoid 45 in exactly the same time that any given mandrel 13 travels from the electrode 26 to the blow-off position adjacent the jets 41, 42 and 43. Thus at the instant each mandrel 13 engages the electrode 26 one of the pins 48 is in a position in alignment over the plunger 57 of the solenoid 58 and as this mandrel moves from the electrode 26 toward the blow-off position it is accompanied by movement of that particular pin 48 toward the switch 46 in timed relation so that said pin reaches a position in alignment below the said switch 46 at the instant that said mandrel 13 reaches the said blow-off position at the jets 41, 42 and 43.

Since the chain 1 carries mandrels 13 at both sides thereof in the manner previously described and since each group of three electrodes 24, 25 and 26 for each such series of mandrels has its own independent electrical equipment for detecting imperfections in the articles, so too will there be separate and distinct blow-off stations and control equipment for the mandrels at each side of the chain. Consequently, while the foregoing description has been confined to the mechanisms and their control equipment for the mandrels at but one side of the chain, it should be understood that a duplicate set of equipment and control means is provided and operative in conjunction with the mandrels at the other side of said chain.

In operation of the device, the arrangement is such that as the mandrels 13 traverse the trough or tank 23 in their lowered or immersed position they first engage the static discharge electrode 24, then the charging electrode 25 and finally the test electrode 26.

In the event that the rubber article on a particular mandrel 13 has no imperfections such as holes or perforations therein no appreciable current leakage takes place through such article and the tube 33 remains inoperative.

In the event, however, that the rubber article on a particular mandrel has a hole or perforation in the immersed portion thereof, the liquid will pass through said hole or aperture and spread out over the inner surface of the article producing a comparatively darker spot or area which is readily detected by visual observation. In addition, after having engaged the first electrode 24 which removes any static charge of electricity from the mandrel, said mandrel next engages the charging electrode 25 which charges the mandrel 13 to a certain potential relative to tank 23.

As previously stated the rubber article in effect constitutes the dielectric of a condenser formed thereby in conjunction with the mandrel body 14 and the liquid bath, and the purpose of charging the mandrel body 14 by contact with the charging electrode 25 is to prevent false operation of the relay R during test through operation of the tube 33 due to the inherent surging action accompanying rapid charging of the condenser. By first charging the said condenser the surging action is expended and is prevented from operating the relay and thus giving a false indication during test. It might be well to note that the surging effect will generally take place even though the rubber article may not be defective and therefore would tend to give a false indication during test were it not for the employment of the charging electrode.

Thus when the mandrel contacts the next or test electrode 26, if the rubber article is not defective, substantially little or no current flows through resistance 34 and the voltage applied to the test electrode has no effect upon the tube 33. If, however, the article is imperfect leakage current will flow through the rubber article and set up across the resistor 34 a voltage differential of such magnitude as to drive the grid positive sufficiently to increase the plate current flow enough to operate the relay R through energization of its winding 36 which thereupon causes the armature 37 to disengage contact 38 and engage the contact 39.

Upon engagement of the armature 37 with the contact 39 the circuit to the solenoid 58 is completed causing the latter to be energized with the result that its plunger 57 is actuated upwardly to engage the overlying pin 48 in the disk 47. The pin 48 is thus actuated upwardly against its spring 52 permitting the associated latch 52 to move radially under the influence of its spring 56 and engage under the shoulder 51 of the pin to hold or retain the latter in the elevated or raised position to which actuated by the said plunger 57.

The pin 48 thus held in raised position rotates with the disk 47 in timed relation to travel of the chain 1 and mandrels 13 at such speed so that at the instant the mandrel carrying the defective article which caused the tube 33 and relay R to operate reaches the blow-off position at jets 41, 42 and 43, the said raised pin 48, actuated upwardly as the result of operation of said relay R, reaches, engages and closes the switch 46 causing energization of the solenoid 45 and opening of the valve 44 whereupon compressed air discharges from said jets 41, 42 and 43 to engage the defective rubber article and expel or blow the same entirely off its mandrel.

Continued movement of the disk 47 carries this raised pin 48 past the switch 46 which thereupon reopens deenergizing the solenoid 45 and closing the air valve 44, and in order that said pin may be reset in its lowered position before again assuming a position in alignment above the plunger 57 of the solenoid 58, a cam 64 is provided and disposed in the path of travel of the associated latch 53 so as to engage the latter and actuate the same radially inward against its spring 56 thus permitting the pin 48 to move downwardly under the influence of its spring 52 to its lower position as limited by the shoulder 51 thereof.

For the purpose also of affording a visible indication by the aforementioned electrical equipment, there is connected to a suitable source of electricity through the armature 37 and contact 38 of the relay R a lamp 66, preferably green in color, which, since the armature 37 of the said relay R is normally in close relation with contact 38, tends to remain lighted so long as no imperfect article is detected. On the other hand, a lamp 65, preferably red in color, is connected across the circuit of the solenoid 58 through the armature 37 and contact 39 of the relay R, and since said armature 37 is normally in open relation with respect to said contact 39, the said lamp 66 will normally remain unlighted when, however, an imperfect article presents itself causing operation of the tube 33 and relay R in the manner aforesaid, the armature opening with respect to contact 38 and closing with respect to contact 39 causes the green lamp 66 to go out and the red lamp 65 to flash on thus giving a visible indication of the detection of an imperfect article.

Therefore in addition to the positive visual detection of holes and perforations afforded by the immersion of the articles in a liquid bath, it will be seen that the invention provides for the removal or segregation of defective articles from the system and those articles which are not imperfect by entirely automatic means free from any element of human error. The result of this is that the manufacturer of the articles is definitely assured that those articles remaining on their mandrels after passing the jets 41, 42 and 43 are wholly free from any imperfection such as a hole or aperture, and may then be removed from their mandrels, by any of the several customary conventional methods such as, for example, angularly disposed revolving brushes, for packaging and shipment to the trade.

A further feature of the invention involves a novel method and mechanism for printing or stamping printed matter, such as a trade mark or name, on the rubber articles, and referring to Figure 1 of the drawings this mechanism is designated generally by the reference character P. As hereinbefore stated, in this particular length of the lower run of the course of the chain I the tracks or guides 18 are omitted and in lieu thereof the mandrels 13 are supported upon and by means of an endless belt 67 which is moving in the direction of and at the exact speed as the chain I so as to prevent rotation of the mandrels about their supporting spindles 11 as described above in connection with the similar arrangement at the mandrel loading station.

Printing or stamping of the articles is accomplished by means of a plurality of stamp pads 68 which are mounted on a belt 69 at equally spaced intervals corresponding exactly to the spacing of the mandrels 13 longitudinally of the chain I. This belt 69 is driven in timed relation with and at the speed of travel of the chain I and the said stamp pads 68 and belt 69 are positioned relative to the mandrels and chain so that the stamp pads 68 engage successive articles on said mandrels in the relative position shown in the drawings. Associated with the belt 69 and its stamp pads 68 is an inking roll 70 and a rotating brush 71 for cleaning said stamp pads 68 of excess ink to prevent smearing. As in the case of the electrical detecting and blow-off mechanisms, a separate printing or stamping mechanism P is provided for the mandrels at each side of the chain I.

While a particular embodiment of the invention has been herein illustrated and described it is not intended that said invention be limited thereto but that changes and modification may be made and incorporated therein within the scope of the annexed claims.

We claim:

1. In apparatus for testing thin rubber articles to detect imperfections such as holes therein, an electrically conductive element arranged to receive and support an article thereon, said element having a cross-sectional area greater than the normal cross-sectional area of the article so that said article is supported on the element in a comparatively stretched condition, a trough containing a liquid in which said article is substantially entirely immersed on said element, electrical means connected to the element and said trough and operable in response to the presence of a hole in the article, and means operable by said electrical means for indicating the presence of a hole in said article.

2. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, a plurality of electrodes arranged to be successively engaged by a portion of the element not covered by the article, means for applying a charging potential to one of said electrodes, means for applying a substantially equal potential to the next engaged electrode, a space discharge device operative in response to the presence of a hole in the article upon contact of the element with said next electrode, and means operable by said space discharge device for indicating the presence of said hole.

3. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, a plurality of electrodes arranged to be successively engaged by a portion of the element not covered by the article, means for applying a charging potential to one of said electrodes, means for applying a substantially equal potential to the next engaged electrode, a space discharge device connected to said next engaged electrode, means normally rendering said space discharge device inoperative, means rendering the space discharge device operative in response to the presence of a hole in the article upon contact of the element with said next electrode, and means operable by said space discharge device for indicating the presence of said hole.

4. In apparatus for testing thin rubber articles to detect imperfections such as holes therein, an electrically conductive element arranged to receive and support an article thereon in a comparatively stretched condition, a trough containing a liquid in which said articles is substantially entirely immersed on said element, a plurality of electrodes arranged to be successively engaged by a portion of the element not covered by the article, means for maintaining the electrode first engaged by said element at ground potential to effect discharge of static electricity from the element, means for applying a charging potential to the second engaged of said electrodes, means for applying a substantially equal potential to the third engaged electrode, a space discharge device operative in response to the presence of a hole in the article upon contact of the element with said next electrode, and means operable by said space discharge device for indicating the presence of said hole.

5. In apparatus for testing thin rubber articles to detect imperfections such as holes therein, the combination of a series of electrically conductive elements supporting the articles thereon, said elements having a cross-sectional area greater than the normal cross-sectional area of the articles so that said articles are supported in a comparatively stretched condition thereon, means for moving said series continuously in one direction along a predetermined path of travel, a trough containing a liquid bath disposed below the series of article supporting elements for a portion of the length of their path of travel, means for supporting said article supporting elements in positions normally above and clear of said trough constructed and arranged to cause the same to be lowered into the trough and returned to their normal positions above and clear of said trough while traversing the latter so that said articles are substantially entirely immersed in the liquid, electrical means connected to the element and said trough and operable in response to the presence of a hole in the article, and means operable by said electrical means for indicating the presence of a hole in said article.

6. In apparatus for testing thin rubber articles to detect imperfections such as holes therein, the combination with a series of elements supporting the articles in a comparatively stretched condition thereon and means for moving said series continuously in one direction along a predetermined path of travel, of a trough containing a liquid bath disposed below the series of article supporting elements for a portion of the length of their path of travel, means for supporting said article supporting elements in positions normally above and clear of said trough constructed and arranged to cause the same to be lowered into the trough and returned to their normal positions above and clear of said trough while traversing the latter so that said articles are substantially entirely immersed in the liquid, a plurality of electrodes arranged to be successively engaged by a portion of the element not covered by the article, means for applying a charging potential to one of said electrodes, means for applying a substantially equal potential to the next engaged electrode, a space discharge device operative in response to the presence of a hole in the article upon contact of the element with said next electrode, and means operable by said space discharge device for indicating the presence of said hole.

7. In apparatus for testing thin rubber articles to detect imperfections such as holes therein, the combination with a series of elements supporting the articles in a comparatively stretched condition thereon and means for moving said series continuously in one direction along a predetermined path of travel, of a trough containing a liquid bath disposed below the series of article supporting elements for a portion of the length of their path of travel, means for supporting said article supporting elements in positions normally above and clear of said trough constructed and arranged to cause the same to be lowered into the trough and returned to their normal positions above and clear of said trough while traversing the latter so that said articles are substantially entirely immersed in the liquid, a plurality of electrodes arranged to be successively engaged by a portion of the element not covered by the article, means for applying a charging potential to one of said electrodes, means for applying a substantially equal potential to the next engaged electrode, a space discharge device connected to said next engaged electrode, means normally rendering said space discharge device inoperative, means rendering the space discharge device operative in response to the presence of a hole in the article upon contact of the element with said next electrode, and means operable by said space discharge device for indicating the presence of said hole.

8. In apparatus for testing thin rubber articles to detect imperfections such as holes therein, the combination with a series of elements supporting the articles in a comparatively stretched condition thereon and means for moving said series continuously in one direction along a predetermined path of travel, of a trough containing a liquid bath disposed below the series of article supporting elements for a portion of the length of their path of travel, means for supporting said article supporting elements in positions normally above and clear of said trough constructed and arranged to cause the same to be lowered into the trough and returned to their normal positions above and clear of said trough while traversing the latter so that said articles are substantially entirely immersed in the liquid, a plurality of electrodes arranged to be successively engaged by a portion of the element not covered by the article, means for maintaining the electrode first engaged by said element at ground potential to effect discharge of static electricity from the element, means for applying a charging potential to the second engaged of said electrodes, means for applying a substantially equal potential to the third engaged electrode, a space discharge device connected to said next engaged electrode, means normally rendering said space discharge device inoperative, means rendering the space discharge device operative in response to the presence of a hole in the article upon contact of the element with said next electrode, and means operable by said space discharge device for indicating the presence of said hole.

9. In apparatus for testing thin rubber articles to detect imperfections such as holes therein, the combination with a series of electrically conductive elements supporting the articles to be tested in a comparatively stretched condition and means for moving said series continuously in one direction along a predetermined path of travel, of a trough containing a liquid disposed below the series of elements for a portion of the length of their path of travel, means for supporting said elements in positions normally above and clear of said trough constructed and arranged to cause the elements to be lowered into the trough and returned again to their normal positions above and clear of said trough while traversing the latter so that the articles on said elements are substantially entirely immersed in the liquid, electrical means connected to the trough and also arranged for successive connection with the elements during immersion thereof in said liquid and operable in response to the presence of a hole in the articles thereon, at least one valve controlled air nozzle disposed adjacent the path of travel of said articles subsequent to said trough, and mechanism travelling in timed relation with the articles including means operable by said electrical means for effecting actuation of said valve to release air through said nozzle and discharge from said elements those articles detected by the electrical means as having a hole therein.

10. In apparatus for testing thin rubber articles to detect imperfections such as holes therein, the combination with a series of electrically conductive elements supporting the articles to be tested in a comparatively stretched condition and means for moving said series continuously in one direction along a predetermined path of travel, of a trough containing a liquid disposed below the series of elements for a portion of the length of their path of travel, means for supporting said elements in positions normally above and clear of said trough constructed and arranged to cause the elements to be lowered into the trough and returned again to their normal positions above and clear of said trough while traversing the latter so that the articles on said elements are substantially entirely immersed in the liquid, electrical means including a space discharge device connected to the trough and also arranged for successive connection with the elements during immersion thereof in said liquid and operable in response to the presence of a hole in the articles thereon, at least one valve controlled air nozzle disposed adjacent the path of travel of said articles subsequent to said trough, and mechanism travelling in timed relation with the articles including means operable by said electrical means for effecting actuation of said valve to release air through said nozzle and discharge from said elements those articles detected by the electrical means as having a hole therein.

11. In apparatus for testing thin rubber articles to detect imperfections such as holes therein, the combination with a series of electrically conductive elements supporting the articles to be tested in a comparatively stretched condition and means for moving said series continuously in one direction along a predetermined path of travel, of a trough containing a liquid disposed below the series of elements for a portion of the length of their path of travel, means for supporting said elements in positions normally above and clear of said trough constructed and arranged to cause the elements to be lowered into the trough and returned again to their normal positions above and clear of said trough while traversing the latter so that the articles on said elements are substantially entirely immersed in the liquid, electrical means connected to the trough and also arranged for successive connection with the elements during immersion thereof in said liquid, said electrical means including a space discharge device operative in response to the presence of a hole in said article, means operable to discharge the articles from said elements, and mechanism operating in timed relation with the travel of said articles including means operable by said space discharge device for actuating said discharge means to discharge from the elements those articles having a hole therein.

12. In apparatus for testing thin rubber articles to detect imperfections such as holes therein, the combination with a series of electrically conductive elements supporting the articles to be tested in a comparatively stretched condition and means for moving said series continuously in one direction along a predetermined path of travel, of a trough containing a liquid disposed below the series of elements for a portion of the length of their path of travel, means for supporting said elements in positions normally above and clear of said trough constructed and arranged to cause the elements to be lowered into the trough and returned again to their normal positions above and clear of said trough while traversing the latter so that the articles on said elements are substantially entirely immersed in the liquid, electrical means connected to the trough and also arranged for successive connection with the elements during immersion thereof in said liquid, a plurality of electrodes arranged to be successively engaged by a portion of the element not covered by the article, means for applying a charging potential to one of said electrodes, means for applying a substantially equal potential to the next engaged electrode, a space discharge device operative in response to the presence of a hole in the article upon contact of the element with said next electrode, and means operable by said space discharge device for indicating the presence of said hole.

13. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, electrical means connected to the element and said trough and operative in response to the presence of a hole in the article, means for discharging said article from the element, and means operatively controlled by said electrical means for actuating said discharge means to discharge from the element an article detected by the electrical means as having a hole therein.

14. In apparatus for testing thin rubber articles to detect imperfections such as holes therein, the combination with a series of elements supporting the articles in a comparatively stretched condition thereon and means for moving said series continuously in one direction along a predetermined path of travel, of a trough containing a liquid bath disposed below the series of article supporting elements for a portion of the length of their path of travel, means for supporting said article supporting elements in positions normally above and clear of said trough constructed and arranged to cause the same to be lowered into the trough and returned to their normal positions above and clear of said trough while traversing the latter so that said articles are substantially entirely immersed in the liquid, electrical means connected to the element and said trough and operable in response to the presence of a hole in the article, at least one valve controlled air nozzle disposed adjacent the path of travel of said articles subsequent to said trough, and mechanism travelling in timed relation with the articles including means operable by said electrical means for effecting actuation of said valve to release air through said nozzle and discharge from said elements those articles detected by the electrical means as having a hole therein.

15. In apparatus for testing thin rubber articles to detect imperfections such as holes therein, the combination with a series of elements supporting the articles in a comparatively stretched condition thereon and means for moving said series continuously in one direction along a predetermined path of travel, of a trough containing a liquid bath disposed below the series of article supporting elements for a portion of the length of their path of travel, means for supporting said article supporting elements in positions normally above and clear of said trough constructed and arranged to cause the same to be lowered into the trough and returned to their normal positions above and clear of said trough while traversing the latter so that said articles are substantially entirely immersed in the liquid, electrical means connected to the element and said trough and operable in response to the presence of a hole in the article, means operable to discharge the articles from said elements, and mechanism operating in timed relation with the travel of said articles including means operable by said electrical means for actuating said discharge means to discharge from the elements those articles having a hole therein.

16. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, means operable to discharge the article from the element, and an electrical system including a space discharge device connected to the element and said trough and operable in response to the presence of a hole in said article for operating said discharge means to discharge from said element an article having a hole therein.

17. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, an electrical circuit including a space discharge device connected to the element and said trough, means operable to discharge the article from the element, means normally rendering the space discharge device inoperative, and means rendering said space discharge device operative in response to the presence of a hole in said article to operate said discharge means to discharge from said element an article having a hole therein.

18. In an apparatus for testing thin rubber articles to detect imperfections such as holes therein, an electrically conductive element arranged to receive and support an article thereon in a comparatively stretched condition, a trough containing a liquid in which said article is substantially entirely immersed on said element, means operable to discharge the article from the element, a plurality of electrodes arranged to be successively engaged by a portion of the element not covered by the article, means for applying a charging potential to one of said electrodes, means for applying a substantially equal potential to the next engaged electrode, and a space discharge device operative in response to the presence of a hole in the article upon contact of the element with said next electrode to effect operation of said discharge means to discharge from said element an article having a hole therein.

19. In an apparatus for testing thin rubber articles to detect imperfections such as holes therein, an electrically conductive element arranged to receive and support an article thereon in a comparatively stretched condition, a trough containing a liquid in which said article is substantially entirely immersed on said element, means operable to discharge the article from the element, a plurality of electrodes arranged to be successively engaged by a portion of the element not engaged by said element at ground potential to effect discharge of static electricity from the element, means for applying a charging potential to the second engaged of said electrodes, means for applying a substantially equal potential to the third engaged electrode, and a space discharge device operative in response to the presence of a hole in the article upon contact of the element with said next electrode for effecting operation of said discharge means to discharge from said element an article having a hole therein.

20. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, means operable to discharge the article from the element, and an electrical system connected to the discharge means, the element and said trough and operable in response to the presence of a hole in the article to effect actuation of said discharge means to discharge from the element an article having a hole therein.

21. In apparatus for testing thin rubber articles to detect imperfections such as holes therein, an electrically conductive element arranged to receive and support an article thereon, said element having a cross-sectional area greater than the normal cross-sectional area of the article so that said article is supported on the element in a comparatively stretched condition, a trough containing a liquid in which said article is substantially entirely immersed on said element, a test electrode arranged to be engaged by a conductive portion of the element while the article is immersed thereon in said liquid, electrical means connected to said test electrode and the trough operative in response to the presence of a hole in the article upon contact of the element with the test electrode, and means operable by said electrical means for indicating the presence of said hole.

22. In apparatus for testing thin rubber articles to detect imperfections such as holes therein, an electrically conductive element arranged to receive and support an article thereon, said element having a cross-sectional area greater than the normal cross-sectional area of the article so that said article is supported on the element in a comparatively stretched condition, a trough containing a liquid in which said article is substantially entirely immersed on said element, a test electrode arranged to be engaged by a conductive portion of the element while the article is immersed thereon in said liquid, means for applying a predetermined potential to said test electrode, a space discharge device operative in response to the presence of a hole in the article upon contact of the element with the test electrode, and means operable by said space discharge device for indicating the presence of said hole.

23. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, a test electrode arranged to be engaged by a conductive portion of the element while the article is immersed thereon in said liquid, means operable to discharge the article from said element and electrical means connected to said test electrode operative in response to the presence of a hole in the article upon contact of the element with the test electrode to effect operation of said discharge means to discharge from said element an article having a hole therein.

24. In apparatus for testing thin rubber articles to detect imperfections such as hole therein, an electrically conductive element arranged to receive and support an article thereon in a comparatively stretched condition, a trough containing a liquid in which said article is substantially entirely immersed on said element, a test electrode arranged to be engaged by a conductive portion of the element while the article is immersed thereon in said liquid, means for discharging said article from the element, means for applying a predetermined potential to said test electrode, and a space discharge device operative in response to the presence of a hole in the article upon contact of said element with the test electrode to effect operation of said discharge means to discharge from the element an article having a hole therein.

25. In apparatus for testing thin rubber articles to detect imperfections such as holes therein, an electrically conductive element arranged to receive and support an article thereon, said element having a cross-sectional area greater than the normal cross-sectional area of the article so that said article is supported on the element in a comparatively stretched condition, a trough containing a liquid in which said article is substantially entirely immersed on said element, electrical means connected to said trough and arranged for connection with said element, said electrical means including a space discharge device having at least an anode, cathode and control grid, a relay arranged for operation by the plate current of said space discharge device, means normally biasing said control grid to render said space discharge device ineffective to operate said relay, means operative in response to the presence of a hole in the article to apply operating potential to the space discharge device sufficient to operate said relay, and means operable by said relay to indicate the presence of the hole in said article.

26. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, electrical means connected to said trough and arranged for connection with said element, said electrical means including a space discharge device having at least an anode, cathode and control grid, a relay arranged for operation by the plate current of said space discharge device, means normally biasing said control grid to render said space discharge device ineffective to operate said relay, means operative in response to the presence of a hole in the article to apply operating potential to the space discharge device sufficient to operate said relay, means for discharging the article from the element, and means operable by said relay to effect operation of said discharge means to discharge from said element an article having a hole therein.

27. In apparatus for testing thin rubber articles to detect imperfections such as holes therein, an electrically conductive element arranged to receive and support an article thereon, said element having a cross-sectional area greater than the normal cross-sectional area of the article so that said article is supported on the element in a comparatively stretched condition, a trough containing a liquid in which said article is substantially entirely immersed on said element, a test electrode arranged to be engaged by a conductive portion of the element while the article is immersed thereon in said liquid, electrical means for applying a predetermined potential to said test electrode and including a space discharge tube having at least an anode, cathode and control grid, a relay arranged for operation by the plate current of said tube, means normally biasing said control grid to render the tube ineffective to operate said relay, means operative in response to the presence of a hole in the article upon contact of the element with the test electrode to apply operating potential to the tube sufficient to operate the relay, and means operable by said relay to indicate the presence of the hole in said article.

28. In apparatus for testing thin rubber articles to detect imperfections such as holes therein, an electrically conductive element arranged to receive and support an article thereon in a comparatively stretched condition, a trough containing a liquid in which said article is substantially entirely immersed on said element, a test electrode arranged to be engaged by a conductive portion of the element while the article is immersed thereon in said liquid, electrical means for applying a predetermined potential to said test electrode and including a space discharge tube having at least an anode, cathode and control grid, a relay arranged for operation by the plate current of said tube, means normally biasing said control grid to render the tube ineffective to operate said relay, means operative in response to the presence of a hole in the article upon contact of the element with the test electrode to apply operating potential to the tube sufficient to operate the relay, means for discharging the article from said element, and means operable by said relay to effect operation of said discharge means to discharge from the element an article having a hole therein.

ARTHUR M. YOUNGS.
JAMES S. BALLANTINE.